(12) United States Patent
Reinke et al.

(10) Patent No.: US 7,618,598 B2
(45) Date of Patent: Nov. 17, 2009

(54) CATALYTIC REACTOR/HEAT EXCHANGER

(75) Inventors: Michael J. Reinke, Franklin, WI (US);
Dennis C. Granetzke, Racine, WI (US);
Mark G. Voss, Franksville, WI (US);
Randolph S. Herrick, Racine, WI (US);
Jonathan P. Wattelet, Gurnee, IL (US);
Roland Strähle, Unterensingen (DE)

(73) Assignee: Modine Manufacturing Company, Racine, WI (US)

( * ) Notice: Subject to any disclaimer, the term of this patent is extended or adjusted under 35 U.S.C. 154(b) by 879 days.

(21) Appl. No.: 10/998,852

(22) Filed: Nov. 29, 2004

(65) Prior Publication Data

US 2006/0115393 A1    Jun. 1, 2006

(51) Int. Cl.
*F28D 7/00* (2006.01)
*H01M 8/00* (2006.01)

(52) U.S. Cl. .......................... 422/198; 429/17
(58) Field of Classification Search .............. 429/12, 429/17, 19, 22; 422/198, 200
See application file for complete search history.

(56) References Cited

U.S. PATENT DOCUMENTS

| 5,853,674 | A | 12/1998 | Lesieur |
| 5,874,051 | A | 2/1999 | Heil et al. |
| 6,132,689 | A | 10/2000 | Skala et al. |
| 6,284,206 | B1 | 9/2001 | Lesieur et al. |
| 6,495,113 | B2 | 12/2002 | Aoyama |
| 2002/0048541 | A1 | 4/2002 | Schodel et al. |
| 2002/0104645 | A1 | 8/2002 | Yoshida et al. |
| 2002/0131919 | A1 | 9/2002 | DeBellis et al. |
| 2002/0141924 | A1 | 10/2002 | Ishikawa |
| 2003/0014865 | A1 | 1/2003 | Nowak et al. |
| 2006/0151156 | A1* | 7/2006 | Valensa et al. .......... 165/167 |

FOREIGN PATENT DOCUMENTS

| DE | 10137888 | 5/2002 |
| DE | 10242020 | 3/2003 |
| DE | 60203315 T | 8/2005 |
| DE | 60107390 T | 12/2005 |
| EP | 0767000 | 4/1997 |
| EP | 1266701 | 12/2002 |
| EP | 1306639 | 5/2003 |
| WO | 03098728 | 11/2003 |

OTHER PUBLICATIONS

German Search Report dated Mar. 3, 2006, 12 pages.

* cited by examiner

*Primary Examiner*—Patrick Ryan
*Assistant Examiner*—Monique Wills
(74) *Attorney, Agent, or Firm*—Michael Best & Friedrich LLP (57) ABSTRACT

A catalytic reactor/heat exchange device (10) is provided for generating a catalytic reaction in a reaction fluid flow (12) and transferring heat to a cooling fluid flow (14). The device includes reaction flow channels (20) with turbulators (30) therein. The turbulators (30) include an initial portion (40) and a selected portion (34) that includes a catalytic layer or coating (36) to initiate the desired catalytic reaction at a location (38) located downstream from the initial portion (40). In some preferred forms, each of the selected portions (34) of the turbulators (30) include at least one downstream section (103, 120) wherein the heat transfer performance has been intentionally reduced to improve performance of the device (10) during start up conditions.

16 Claims, 10 Drawing Sheets

CATALYTIC REACTOR/HEAT EXCHANGER

FIELD OF THE INVENTION

This invention relates to catalytic reactor/heat exchanger devices and in more particular applications, to such device as used in fuel processing systems, such as those that produce hydrogen.

BACKGROUND OF THE INVENTION

There are many known types of catalytic reactors. For example, catalytic reactors are common in fuel processing systems or subsystems, such as those that produce hydrogen. For example, proton exchange membrane (PEM) fuel cell systems will commonly include a fuel processing subsystem that produces hydrogen.

More specifically, in many PEM fuel cell systems, a fuel such as methanol, methane, or a similar hydrocarbon fuel is converted into a hydrogen-rich stream for the anode side of the fuel cell. In many systems, humidified methanol or natural gas (methane) and air are chemically converted to a hydrogen-rich stream known as reformate by a fuel processing subsystem of the fuel cell system. This conversion takes place in a reformer where the hydrogen is catalytically released from the hydrocarbon fuel. A common type of reformer is an Auto-thermal Reactor (ATR), which uses air and steam as oxidizing reactants. As the hydrogen is liberated, a substantial amount of carbon monoxide (CO) is created which must be reduced to a low level (typically less than 10 ppm) to prevent poisoning of the PEM membrane.

To reduce the CO concentration to within acceptable levels, several catalytic reactions will generally be used in the fuel processing subsystem to remove CO in the reformate flow. Typical reactions for reduction of CO in the reformate flow include a water-gas shift, as well as a selective oxidation reaction over a precious metal catalyst (with a small amount of air added to the reformate stream to provide oxygen) in a device commonly referred to as a selective oxidizer. Generally, several stages of CO cleanup are required to obtain a reformate stream with an acceptable CO level. Each of the stages of CO cleanup requires the reformate temperature to be reduced to relatively precise temperature ranges so that the desired ca-catalytic reactions will occur and the loading amount of precious metal catalyst can be minimized.

For example, the desired reaction during a selective oxidation process is [$2\ CO+O_2 \rightarrow 2\ CO_2 +283$ KJ/mol]. However, there are other competing reactions that are detrimental to the removal of CO from the reformate stream. Specifically, the other competing reactions are a hydrogen oxidation [$H_2 + \frac{1}{2}O_2 \rightarrow H_2O+242$ KJ/mol] which converts desired hydrogen gas into water, a reverse water-gas shift [$CO_2+H_2+41$ KJ/mol$\rightarrow H_2O+CO$] which creates additional harmful CO as well as depleting the amount of hydrogen gas, and methanations [$CO+3H_2 \rightarrow CH_4+H_2O+206$ KJ/mol] and [$CO_2+4 H_2 \rightarrow CH_4+2\ H_2O+165$ KJ/mol] which also deplete the amount of hydrogen gas in the reformate stream. The catalyst and initial temperature are chosen to favor the CO oxidation over the reverse water-gas shift and methanation. However, temperature fluctuations can cause the competing reactions to hinder CO removal performance. Furthermore, the optimum temperature for selective oxidation varies depending upon the concentration of carbon monoxide in the reformate. More specifically, the optimum temperature for selective oxidation typically tends to decrease as the concentration of carbon monoxide in the reformate decreases. Additionally, the activity of the catalyst, or the rate at which the desired reaction occurs, is a function of the concentration of the reactants (CO and $O_2$) and temperature.

The CO oxidation reaction, the $H_2$ oxidation reaction, as well as the methanation reaction are all exothermic, releasing heat as each respective reaction progresses. Therefore, the temperature of the reformate fluid stream can increase as much as 100° C. as it passes through a selective oxidation reactor even if the desired selective oxidation reaction initially dominates. As the temperature increases, the reaction selectivity for CO oxidation decreases with respect to the competing reactions, there-by decreasing overall CO removal efficiency. Thus, it is desirable to remove heat from the reformate flow as it is reacted so as to not lose selectivity of the reaction. However; during low temperature start up conditions, cooling of the reformate fluid stream in the catalytic reaction region can be undesirable because it reduces the already low activity of the catalytic reaction. In fact, it can be advantageous not to cool the reformate during a low temperature start up, because this would allow the catalyst to come up to temperature more quickly.

SUMMARY OF THE INVENTION

It is the primary object of the invention to provide an improved catalytic reactor.

According to one aspect of the invention, a catalytic reactor/heat exchange device is provided for generating a catalytic reaction in a reaction fluid flow and transferring heat to a cooling fluid flow. The catalytic reactor/heat exchange device includes a reaction flow inlet, a reaction flow outlet, a set of reaction flow channels extending between the reaction flow inlet to the reaction flow outlet to direct the reaction fluid flow through the device, a set of cooling flow channels interleaved with the reaction flow channels to direct the cooling fluid flow in heat exchange, counterflow relation with the reaction fluid flow, and turbulators in each of the reaction flow channels. A selected portion of each of the turbulators includes a catalytic layer to initiate the catalytic reaction at a location spaced downstream from the reaction flow inlet, with the catalytic layer beginning at the location and extending toward the reaction flow outlet. An initial portion of each of the turbulators extends from the reaction flow inlet to the location and is free of the catalytic layer to delay the catalytic reaction until the reaction fluid flow reaches the location.

In one aspect of the invention, the selected portion of each of the turbulators is a separate piece from the initial portion of each of the turbulators.

In another aspect, the selected portion and the initial portion of each of the turbulators are a unitary construction.

In accordance with one aspect, each of the reaction flow channels is bounded by a pair of spaced, generally planar heat transfer surfaces, and each of the turbulators includes a plurality of alternating peaks and valleys joined by wall sections. Each of the peaks is adjacent one of the pair of heat transfer surfaces, and each of the valleys is adjacent the other of the pair of heat transfer surfaces. In a further aspect, each of the selected portions includes a downstream section wherein the wall surfaces are interrupted by louvers having lengths that extend generally parallel to the pair of heat transfer surfaces. In another aspect, each of the selected portions includes a downstream section wherein the peaks and valleys are spaced closer to each other than the peaks and valleys of the remainder of the selected portion in a direction transverse to the planes of the pair of heat transfer surfaces and are spaced from the pair of heat transfer surfaces to minimize the transfer of heat from the downstream section to the pair of heat transfer surfaces. In yet another aspect, each of the selected portions includes an upstream section wherein the peaks and valleys are brazed to the pair of heat transfer surfaces, and a downstream section wherein the peaks and valleys are not brazed to the pair of heat transfer surfaces to minimize the transfer of heat from the downstream section to the pair heat transfer surfaces. According to another aspect, each of the selected portions includes a downstream section wherein the peaks and valleys are removed to minimize the transfer of heat from the downstream section to the pair of heat transfer surfaces.

In one aspect of the invention, the turbulators are lanced-and-offset fins.

According to one aspect, the reaction and flow channels are defined by plates located between each of the channels and bars located between each of the plates.

In one aspect, the flow channels are defined by drawn cup plates located between each of the flow channels with embossment that extend from each of the plates to contact adjacent plates to bound the flow channels.

In accordance with one aspect, each of the flow plates includes a reaction flow inlet opening in fluid communication with the reaction flow inlet, a reaction flow outlet opening in fluid communication with a reaction flow outlet, a cooling flow inlet opening, and a cooling flow outlet opening. Each of the reaction flow channels includes a pair of flow directing inserts therein. One of the inserts surrounds an aligned pair of the cooling flow outlet openings and includes a profiled surface extending across the reaction flow channel from an aligned pair of the reaction flow inlet openings to direct the reaction fluid flow therefrom across the reaction flow channel. The other of the inserts surrounds an aligned pair of the cooling flow inlet openings and includes a profiled surface extending across the reaction flow channel from an aligned pair of the reaction flow outlet openings to direct the reaction fluid flow across the reaction flow channel to the aligned pair of reaction flow outlet openings. Each of the cooling flow channels includes another pair of flow directing inserts therein, with one of the inserts surrounding an aligned pair of the reaction flow outlet openings and including a profiled surface extending across the cooling flow channel from an aligned pair of the cooling flow inlet openings to direct the cooling fluid flow therefrom across the cooling flow channel, and the other of the inserts surrounding an aligned pair of the reaction flow inlet openings and including a profiled surface extending across the cooling flow channel from an aligned pair of the cooling flow outlet openings to direct the cooling fluid flow across the cooling flow channel to the aligned pair of cooling flow outlet openings.

According to one aspect of the invention, each of the initial portions occupies about 25% to 50% of the corresponding reaction flow channel. In a further aspect, each of the initial portions occupies about 25% of the corresponding reaction flow channel.

Other objects, advantages, and aspect of the invention will be apparent from a complete review of the entire specification, including the appended claims and drawings.

DETAILED DESCRIPTION OF THE PREFERRED EMBODIMENT

Figure 1:
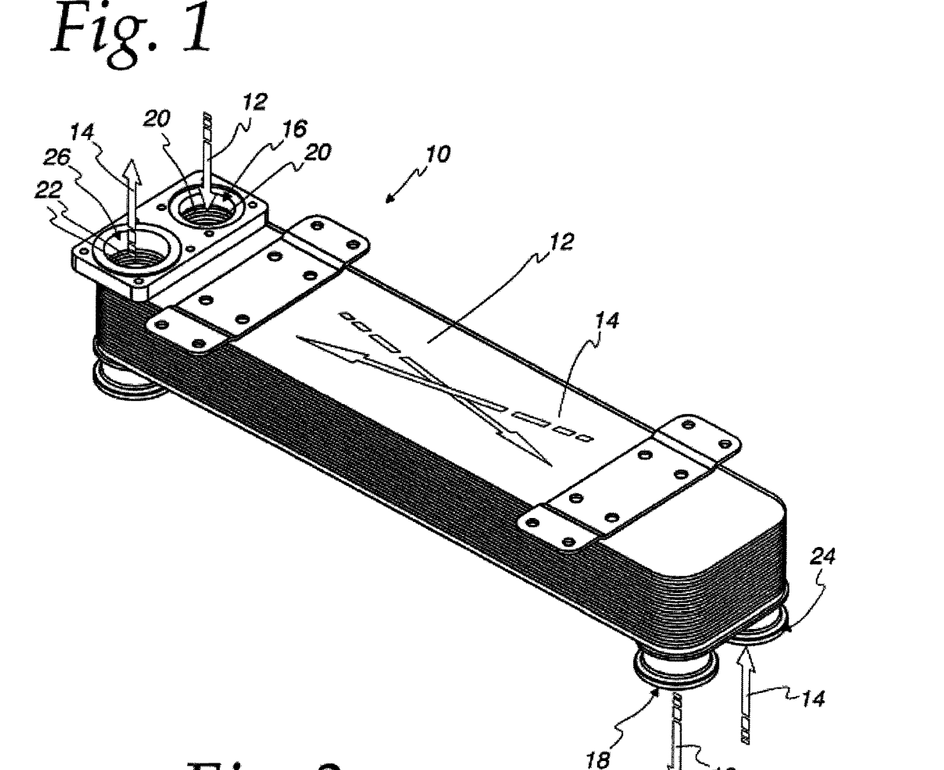
FIG. 1 is a perspective view of a catalytic reactor/heat exchange device embodying the present invention.
Figure 2:
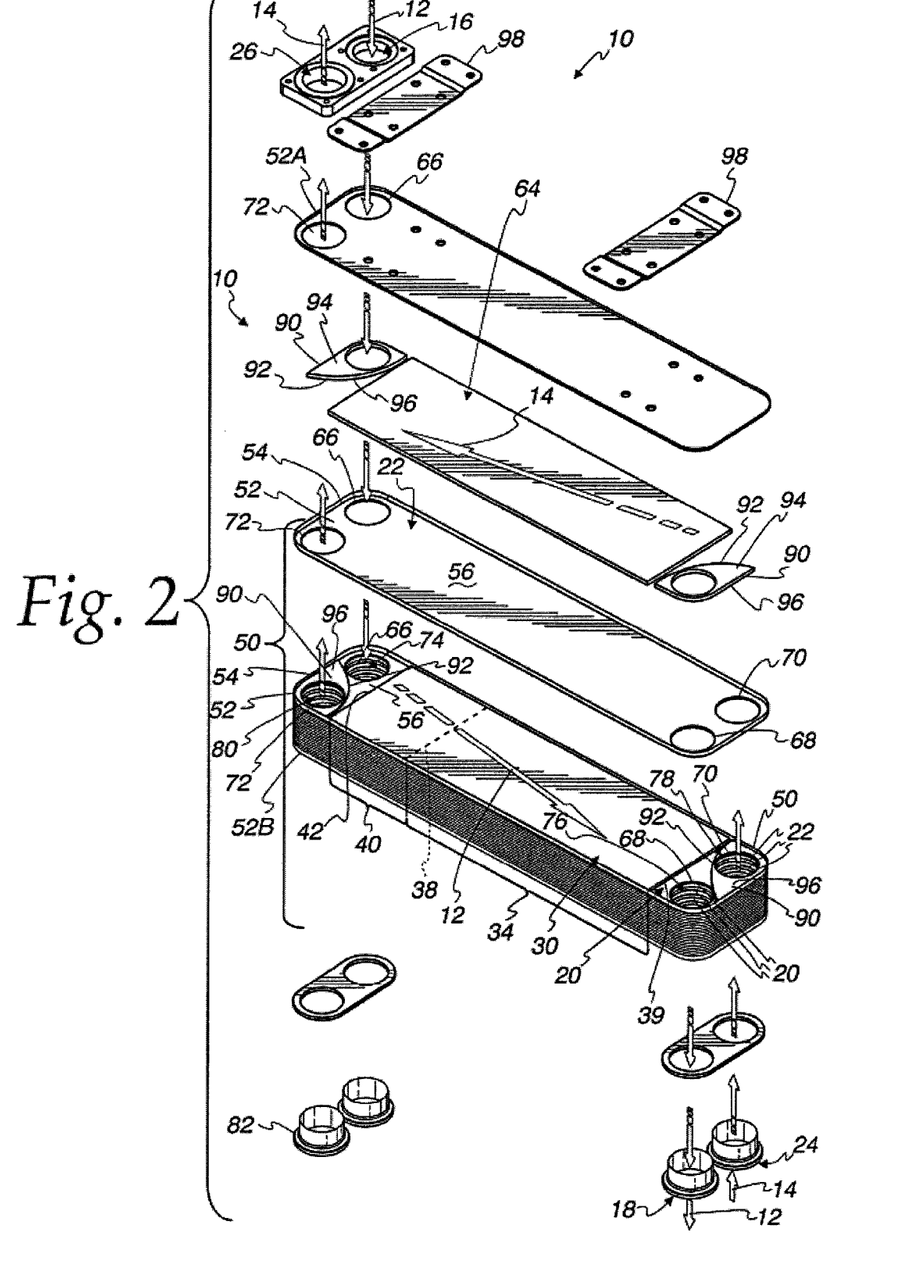
FIG. 2 is an exploded perspective view of the device of FIG. 1.

As seen in FIGS. 1 and 2, a catalytic reactor/heat exchange device 10 embodying the present invention is provided for generating a catalytic reaction in a reaction fluid flow (shown somewhat schematically by arrowed lines 12) and transferring heat to a cooling fluid flow (shown somewhat schematically by arrowed lines 14). One potential and preferred application for the device 10 is for use as a selective oxidizer in a fuel processing system that produces hydrogen such as was discussed in more detail in the BACKGROUND OF THE INVENTION section of this application. However, it will be appreciated by those skilled in the art that the device 10 will find use in any number of other systems that require a catalytic reaction. Accordingly, no limitation to use with a fuel processing system or a fuel cell system is intended unless specifically recited in the claims.

The device 10 includes a reaction flow inlet 16, a reaction flow outlet 18, a set of reaction flow channels 20 (one shown exposed in FIG. 2) extending between the inlet 16 and the outlet 18 to direct the reaction fluid flow 12 through the device 10, a set of cooling flow channels 22 (again one shown exposed in FIG. 2) interleaved with the reaction flow channels 20 to direct the cooling fluid flow 14 in heat exchange, counter-flow relation with the reaction fluid flow 12. The cooling flow channels 22 extend between a cooling flow inlet 24 and a cooling flow outlet 26 to direct the cooling fluid flow 14 through the device 10.

The device 10 further includes turbulators 30 (shown in the form of a unitary turbulator plate 30 in FIG. 2) in each of the reaction flow channels 20. One preferred form for the turbulator 30 is shown in partial, perspective view in FIG. 3 in the form of a lanced-and-offset turbulator fin. Returning to FIG. 2, a selected portion 34 of each of the turbulators 30 includes a catalytic layer or coating 36 on the surfaces of the turbulator 30 to initiate the desired catalytic reaction at a location, illustrated by dashed line 38 in FIG. 2, spaced downstream from the reaction flow inlet 16. The catalytic layer 36 begins at the location 38 and extends towards the reaction flow outlet 18, and in the embodiment shown in FIG. 2, extends over the entire remaining length of the turbulator 30 between the location 38 and a trailing edge 39 of the turbulator 30. An initial portion 40 of each 5 of the turbulators 30 extends between the reaction flow inlet 16 to the location 38, preferably from a leading edge 42 of the turbulator 30 to the location 38, and is free of the catalytic layer 36 to delay the catalytic reaction until the reaction fluid flow 12 reaches the location 38. It should be appreciated that by providing the initial portion 40, the reaction fluid flow 12 flowing through the flow channels 20 and the turbulators 30 can be cooled to the optimum temperature range for the desired catalytic reaction by the cooling fluid 14 flowing through the flow channels 22. Thus, the initial portions 40 of the turbulators 30 can act as a precooler that provides the reaction fluid flow 12 within the optimum temperature range for the desired catalytic reaction when the reaction fluid flow 12 reaches the location 38 and contacts the catalytic layer 36, thereby initiating the catalytic reaction. This is desirable in that it can eliminate a separate heat exchanger or precooler that has been required in conventional fuel processing systems.

The catalytic coating 36 can be applied to the selected portion 34 using any suitable means, either prior to assembly and brazing of the device 10 or after the assembly and brazing of the device 10. For example, a flood-coating process can be used to apply the catalytic coating 36 to the device 10 after brazing.

Turning now to the details of the construction shown in FIGS. 1 and 2, it can be seen that this embodiment of the device is formed from a stack 50 of nested, drawn-cup type plates 52 with embossments in the form of edge flanges 54 that extend from each of the plates 52 to contact adjacent plates 52 to bound the flow channels 20 and 22 which are located in alternating fashion between the plates 52 in the stack 50. Each of the plates 52 includes generally planar heat transfer surfaces 56 such that each of the flow channels 20 and 22 is bounded by a spaced pair of the surfaces 56 of adjacent pairs of the plates 52.

Figure 3:
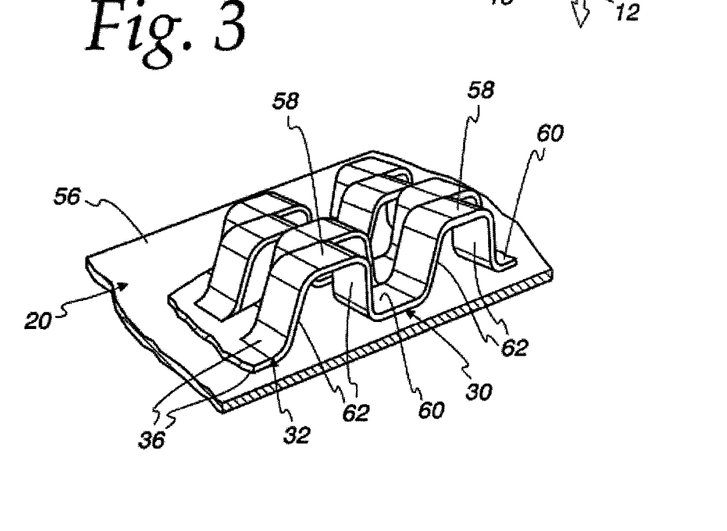
FIG. 3 is an enlarged, partial perspective view of a turbulator fin that can be used in the device of FIG. 1.

With reference to FIG. 3, each of the turbulators 30 includes a plurality of alternating peaks 58 and valleys 60 joined by wall sections 62. Each of the peaks 58 is adjacent one heat transfer surfaces 56 that bound the flow channel 20, and each of the valleys 60 is adjacent the other of the heat transfer surfaces 56 (not shown in FIG. 3) that bound the corresponding flow channel 20. Preferably, the peaks 58 and valleys 60 are bonded, such as by brazing, to their respective heat transfer surfaces 56 to improve the heat transfer thereto. It should be understood that while lanced-and-offset fins are preferred, in some applications it may be desirable to utilize other suitable turbulators, many of which are known. For example, louvered corrugated or serpentine fins can be used, or embossed turbulators can be formed in the planar surfaces 56.

It is also preferred for suitable heat transfer fins or turbulators 64 to be provided in each of the cooling flow channels 22 to enhance the heat transfer to the cooling flow 14. In this regard, any suitable heat transfer fin or turbulator may be used as required by the specific parameters of the required application.

Turning again to each of the plates 52, as is common for this type of construction, each of the plates 52 includes four flow openings 66, 68, 70, 72. The opening 66 serves as a reaction flow inlet opening, the opening 68 serves as a reaction flow outlet opening, the opening 70 serves as a cooling flow inlet opening, and the opening 72 serves as a cooling flow outlet opening, as best seen in FIG. 2. The openings 66 are aligned to define a reaction flow inlet manifold 74 that distributes the reaction fluid flow 12 to each of the flow channels 20. The flow openings 68 are aligned with each other to define a reaction flow outlet manifold 76 that collects the reaction fluid flow 12 from each of the flow channels 20 and directs the reaction fluid flow 12 to the outlet 18. The openings 70 are aligned to define a cooling flow inlet manifold 78 that distributes the cooling fluid flow 14 from the inlet 24 to each of the flow channels 22, and the openings 72 are aligned to define a cooling flow outlet manifold 80 that collects the cooling fluid flow 14 from each of the flow channels 22 and directs the same to the outlet 26.

The stack 50 further includes an end plate 52A that does not include the openings 68 and 70, but does include the openings 66 and 72, and another end plate 52B that does include the openings 68 and 70 and may optionally include the opening 72 if a cooling flow bypass connection 82 is desired for a cooling flow that bypasses the flow channels 22 to combine with the cooling flow 14 in the cooling flow outlet manifold 80.

One feature of the embodiment of the device 10 shown in FIGS. 1 and 2 is the provision of a pair of flow directing inserts 90 in each of the flow channels 20 and 22. Each of the inserts 90 surrounds a corresponding pair of the aligned openings 66, 68, 70, or 72, and includes a profiled surface 92 extending across the associated flow channel 20 or 22 from an opposite, aligned pair of the openings 66, 68, 70 or 72 that are open to the corresponding flow channel 20 or 22. The profiled surface 92 serves to direct the corresponding fluid flow 12 or 14 from the opposite, aligned pair of the openings 66, 68, 70 or 72 across the corresponding flow channel 20 or 22 in order to get a good distribution of the respective fluid flow 12 or 14 across the corresponding flow channel 20 or 22. Preferably, the thickness to the inserts 90 corresponds to the thickness of the turbulator 30 or 64 provided in the corresponding flow channel 20 or 22 so that there is good contact between the opposite faces 94 and 96 of each of the inserts and the corresponding heat transfer surfaces 56 that bound the corresponding flow channel 20 or 22 to allow the faces 94 and 96 to be bonded thereto, such as by brazing, in order to prevent leakage from the pair of openings 66, 68, 70 or 72 that are surrounded by the insert 90. To state this is other words, each of the inserts 90 provides the dual function of sealing one aligned pair of the openings 66, 68, 70 or 72 from the corresponding flow channel 20 or 22 while directing the associated fluid flow 12 or 14 into or out of the corresponding flow channel 20 or 22 from or to the corresponding manifold 74, 76, 78 or 80.

The device 10 further includes a pair of mount flanges 98 fixed to an exterior surface of the plate 52a to provide mounting points for the device 10. It should be understood that the flanges 98 are not critical to the invention and any form of mount or mount flange can be used.

Preferably, the plates 52 are clad of a suitable brazing alloy so that the components of the device 10 can be brazed as an assembled stack.

As discussed in the BACKGROUND section of the application, the activity of the catalyst, or the rate at which the reaction occurs, is a function of the concentration of the reactants ($CO_2$) and temperature. The higher the concentration and temperature, the higher the activity. Under normal operating conditions, most of the reactions are completed (and the injected oxygen is used up) in the first 25-40% of the total catalyst length, i.e., the total length of the selected portion 34, with the remaining downstream portions or sections being essentially inactive. However, when the temperatures in the flow channels 20 are low, such as during start up, the catalyst in the catalytic layer 36 is less active and the downstream portion of the catalyst layer 36 and turbulator 30 become more important in ensuring that the reactions are completed. In this regard, it would be advantageous to not cool the reformate flow 12 during a cold start up as this would allow the flow channels 20, including the catalytic layer 36 and the reformate flow 12 to come up to temperature more quickly. On the other hand, also as discussed in the BACKGROUND section, it is important to cool the reformate flow 12 during normal operating conditions so that the catalytic reaction does not lose selectivity. The embodiments shown in FIGS. 4 and 5 are directed towards meeting both of the above-discussed objectives—cooling the reformate flow 12 for normal operation and reduced cooling of the reformate flow 12 for start up.

Figure 4:
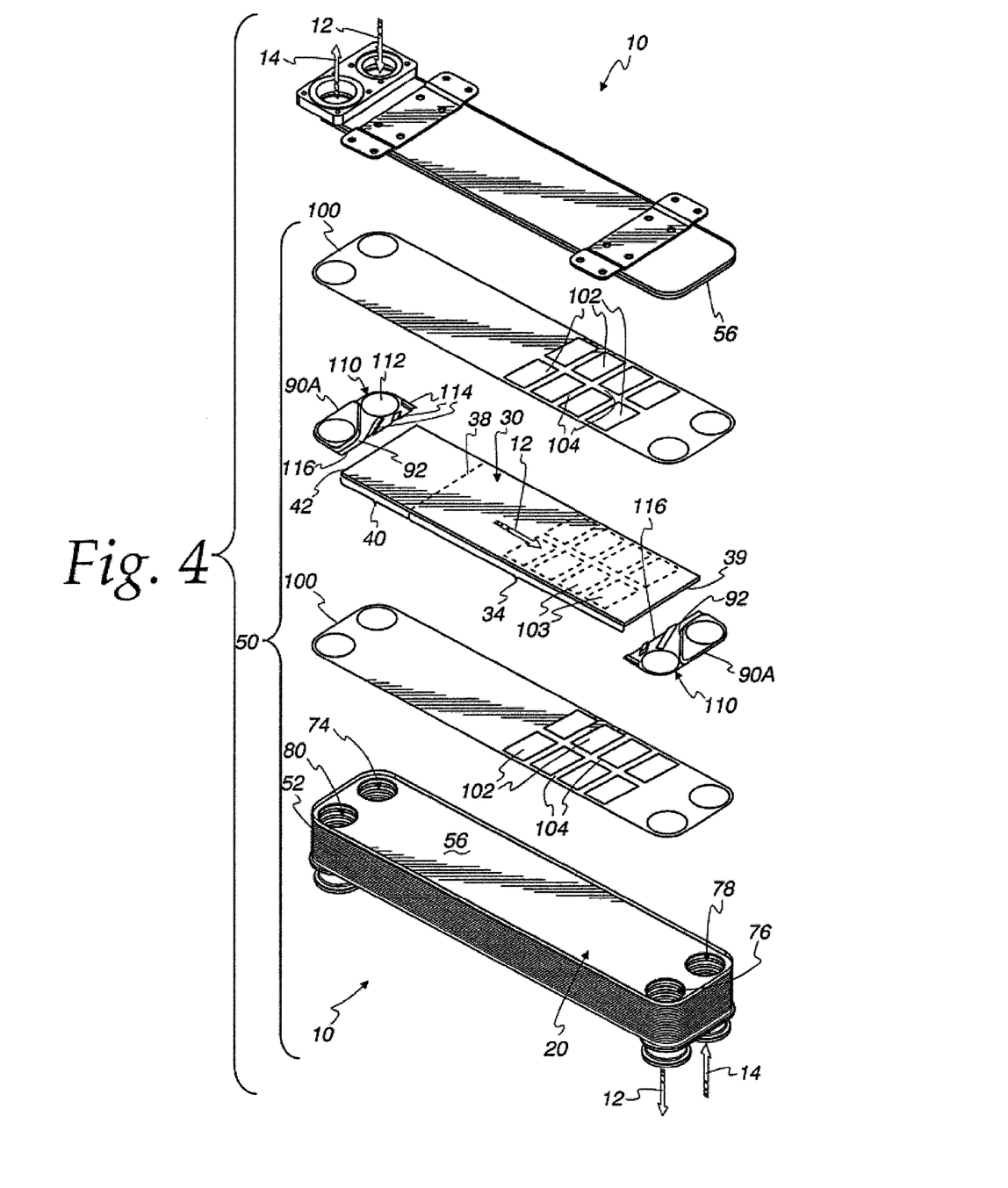
FIG. 4 is an exploded perspective view showing another embodiment of the device of FIG. 1.
Figure 5:
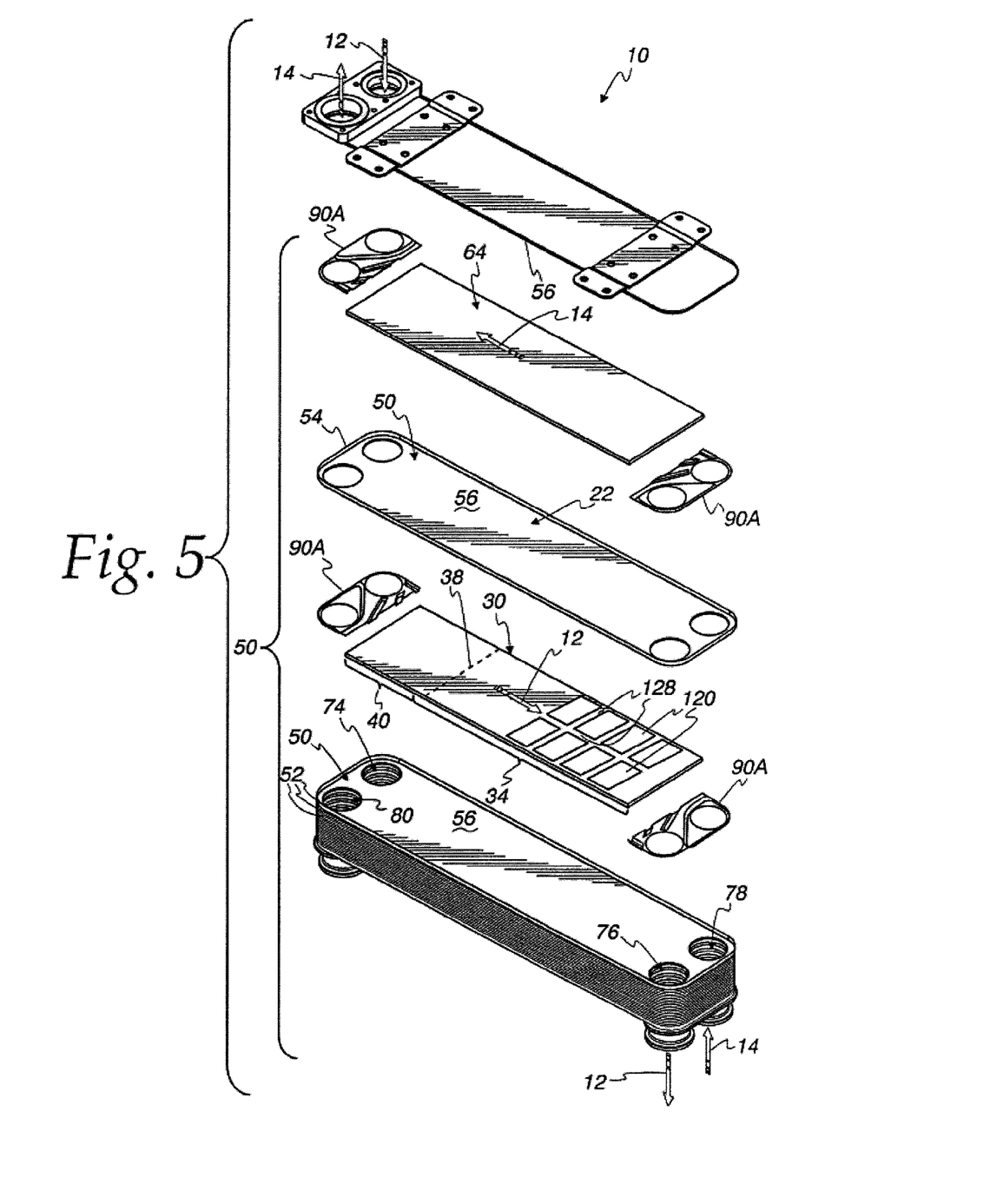
FIG. 5 is an exploded perspective view showing yet another embodiment of the device of FIG. 1.

With reference to FIG. 4, another embodiment of the device shown in FIG. 1 is shown in an exploded, perspective view, with like reference numbers indicating like features from the previously described embodiment shown in FIG. 2. In this embodiment, a pair of identical braze sheets 100 are provided in each of the flow channels 20 on opposite sides of each of the turbulators 30 between the turbulator 30 and each of the associated pair of heat transfer surfaces 56. The braze sheets 100 provide the required braze alloy, rather than having clad braze alloy on the heat transfer surfaces 56 of the plates 52. One or more cutouts 102 (eight shown in FIG. 4) are provided in each of the braze sheets 100 in order to eliminate any braze alloy between the downstream portions or sections 103 of the turbulator 30 underlying the cutouts 102 and the corresponding heat transfer surface 56. This serves the purpose of eliminating a braze joint between the associated heat transfer surface 56 and each of the sections 103 of the turbulator 30 underlying each of the cutouts 1 02, thereby reducing the heat conduction between the section 103 of the turbulator 30 and the associated surfaces 56 and minimizing the transfer of heat from the downstream sections 103 of each turbulator 30 to the associated heat transfer surfaces 56.

As an alternative to the brazed sheets 100 with cutouts 102, areas equivalent to the cutouts 102 can be created by masking the surfaces 56 with a material ("stop-off") that prevents braze alloy penetration.

As seen in FIG. 4, there are eight cutouts 102 which are surrounded by relatively narrow brazed borders 104 in order the minimize the expansion of unsupported portions of the surfaces 56 by bonding the surfaces 56 to the portions of the turbulator 30 that underlie the borders 104. The exact configuration of the borders 104 in the downstream sections 102 will be highly dependent upon the particular parameters of each application, including the internal pressures and the materials selected for the plates 50, in order top maintain adequate structural integrity.

The embodiment of FIG. 4 also includes modified forms 90A of the inserts 90 shown in FIG. 2. The inserts 90A differ from the inserts 90 in that the inserts 90A including an extension portion 110 that extends outwardly from an edge of the profiled surface 92. The extension 110 includes an opening 112 that is aligned with an associated one of the openings 66, 68, 70 or 72. The extension 110 further includes embossed guide vanes or ridges 114 that assist in the distribution of fluid flow across the corresponding flow channel 20,22 of the fluid flow exiting the opening 112. The extension 110 also includes a locating edge 116 that abuts the trailing or leading edge 39,42 of the associated turbulator 30,64 located in the corresponding flow channel 20,22.

Figure 10:
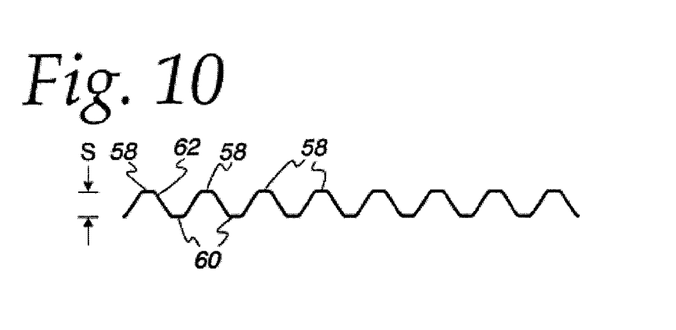
FIG. 10 is a partial view taken from line 10-10 in FIG. 9.
Figure 11:
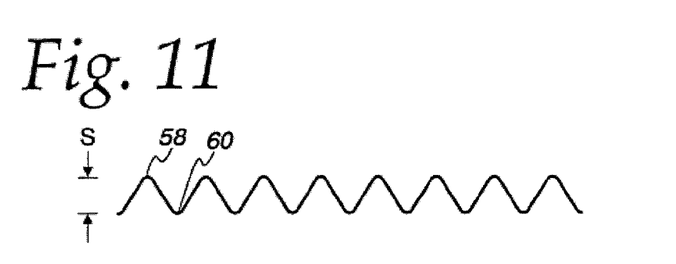
FIG. 11 is a partial view taken from line 11-11 in FIG. 9.

An exploded view of another embodiment of the device 10 of FIG. 1 is shown in FIG. 5, again with like reference numbers indicating like components to those previously described in connection with FIGS. 2 and 4. This embodiment is similar to that of FIG. 4 in that it includes at least one downstream section in each of the flow channels 20 wherein the heat transfer performance is intentionally reduced with respect to the remainder of the selected portion 34. In this embodiment, the lowered heat transfer performance is achieved by modifying the structure of each of the turbulators 30 in each of the flow channels 20. More specifically, the down-stream section is defined by one or more sections 120 (eight shown in FIG. 5) in each of the turbulators 30 wherein the structure of the turbulator 30 has been modified to reduce the heat transfer conduction flow path between the blocks 120 and the corresponding pair of surfaces 56. This reduction can be achieved in at least one of three ways, with one way described and shown in connection with FIGS. 6-8, another way described and shown in connection with FIGS. 9-11, and a third way shown in connection with FIGS. 12-14.

Figure 6:
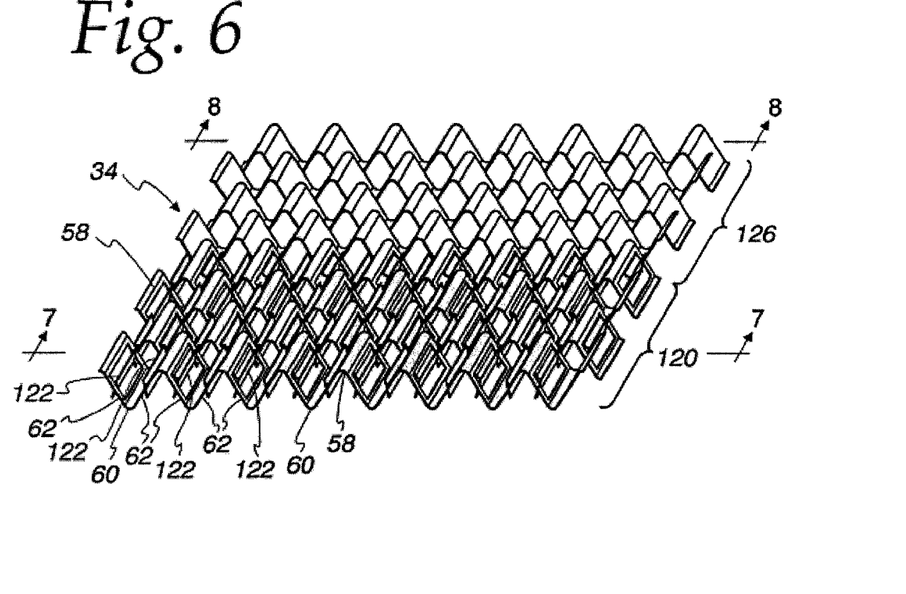
FIG. 6 is a perspective view showing part of a turbulator fin for use in the device of FIG. 5.
Figure 7:
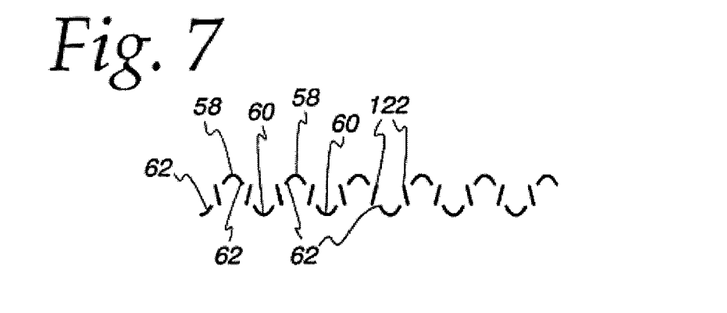
FIG. 7 is a partial view taken from line 7-7 in FIG. 6.
Figure 8:
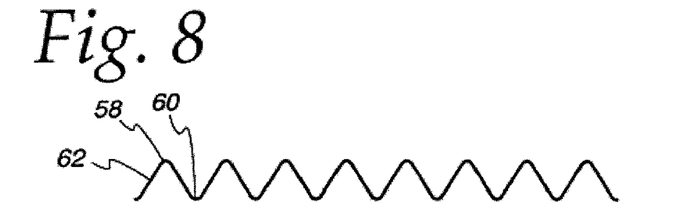
FIG. 8 is a partial view taken from line 8-8 in FIG. 6.

With reference to FIG. 6, part of a lanced-and-offset turbulator 30 is shown in perspective view. As seen in FIGS. 6 and 7, each of the walls 62 of the turbulator structure in the block 120 have been modified by forming a louver 122 therein with lengths that extend parallel (within normal manufacturing tolerances) to the heat transfer surfaces 56 and the plane of the turbulator 30. The louvers 122 serve to minimize the heat conduction flow paths in each of the walls 62, which in turn reduces the heat transfer from the blocks 120 of the turbulator 30 to the associated pair of heat transfer surfaces 56. It can be seen in FIG. 8 that the remaining turbulator structure 126 in the selected portion 34 is unmodified and accordingly has a higher heat transfer coefficient to each of the surfaces 56 in comparison to the structure in the blocks 120.

Figure 9:
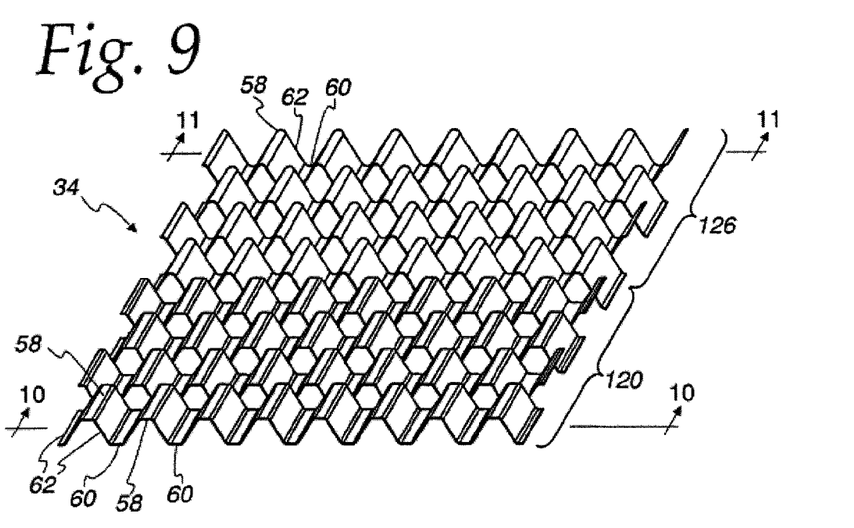
FIG. 9 is a perspective view showing part of another turbulator that can be used in the device of FIG. 5.

FIG. 9 shows another embodiment of the turbulator 30 wherein each of the sections 120 is provided by reducing the distance S between the peaks 58 and valleys 60 in each of the sections 120 in comparison to the distance S between the peak 58 and valley 60 of the remainder 126 of the selected portion 34. To state this in other terms, the peaks 58 and valleys 60 are spaced closer to each other in each of the sections 120 than the peaks 58 and valleys 60 of the remainder of the selected portion 34 in a direction transverse to the planes of the pair of heat transfer surfaces 56 and the turbulator 30. This results in the peaks 58 and valleys 60 of each of the sections 120 being spaced from the pair of heat transfer surfaces 56 which increases the length of the heat conduction flow path between the turbulator structure in each of the sections 120 and the surfaces 56 in comparison to the remainder 126 of the selected portion 34. The sections 120 can be formed by spanking or crushing the peaks 58 and valleys 60 in the sections 120, or by rolling the sections 120 with shorter wall sections 62.

Figure 12:
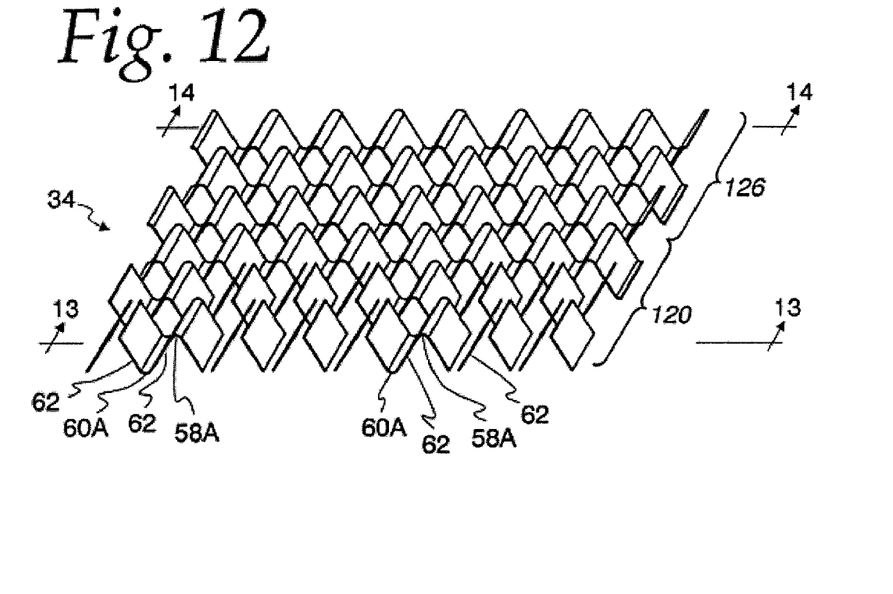
FIG. 12 is a perspective view showing part of another turbulator fin that can be used in the device of FIG. 5.
Figure 13:
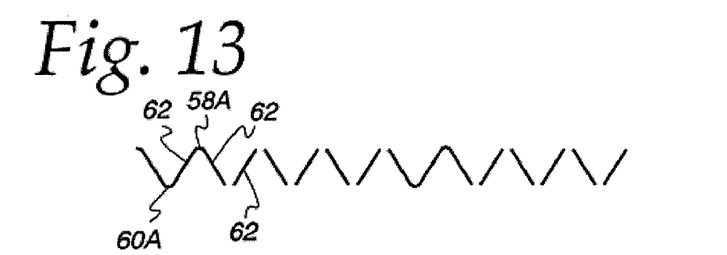
FIG. 13 is a partial view taken from line 13-13 in FIG. 12.
Figure 14:
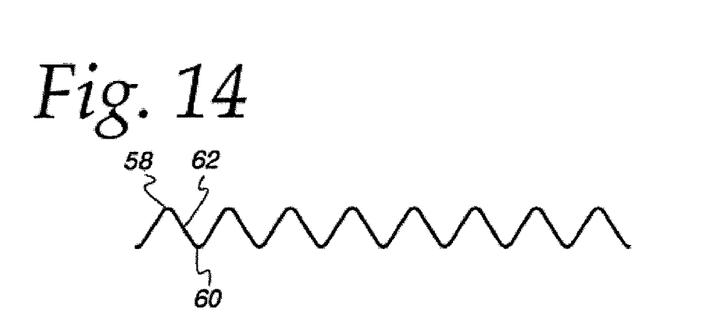
FIG. 14 is a partial view taken from line 14-14 in FIG. 12.

Yet another form of the turbulator 30 of the embodiment of FIG. 5 is shown in FIGS. 12-14. In this embodiment, the majority of the peaks 58 and valleys 60 in the downstream section 120 have been removed from the turbulator 30, with only occasional ones 58A and 60A being kept intact so as to maintain the structural integrity of the turbulator 30 during assembly. The removal of the peaks 58 and valleys 60 in each of the sections 120 increases the length of the heat transfer conduction flow path between the turbulator structure and the surfaces 56 in the downstream section 120, thereby reducing the heat transfer in comparison to the remainder 126 of the selected portion 34 which preferably does not have any of its peaks 58 and valleys 60 removed.

Similar to the embodiment of FIG. 4, each of the aforementioned embodiments of the turbulator 30 for the embodiment of FIG. 5 include relatively narrow borders 128 that are part of the remainder 126 (i.e., the turbulator structure has not been modified) in order the minimize the expansion of unsupported portions of the surfaces 56 by maintaining the structural integrity of the borders 128. Again, as with the embodiment of FIG. 4, the exact configuration of the borders 128 will be highly dependent upon the particular parameters of each application in order to maintain adequate structural integrity.

Because the downstream sections 103, 120 in each of the above described embodiments of FIGS. 4 and 5 are essentially active only during start up when the activity of the upstream catalyst is not sufficient to complete the reactions, minimizing the heat transfer from the downstream sections 103, 120 has the desirable effect of allowing the downstream sections 103, 120 including the catalytic layer 36 thereon and the reformate flow 12 passing therethrough, to heat up relatively quickly during start up conditions by retaining much of the heat from the catalytic reactions occurring in the downstream sections 103, 120 and thereby improving the desired catalytic reaction under start up conditions and particularly under low temperature start up conditions. On the other hand, because the downstream sections 103, 120 are essentially active only during start up, the reduction of heat transfer performance in the sections 103, 120 has little effect on normal operation because there is little or no heat generation in the downstream catalytic coating 36 because the reactants, CO and $O_2$, have been depleted. While the heat transfer performance of the downstream sections 103, 120 is poor, the downstream sections 103, 120 still provide a high surface area for the catalytic coating 36 and good mixing to get the reactants to the catalytic layer 36 during start up.

Figures 15, 16:
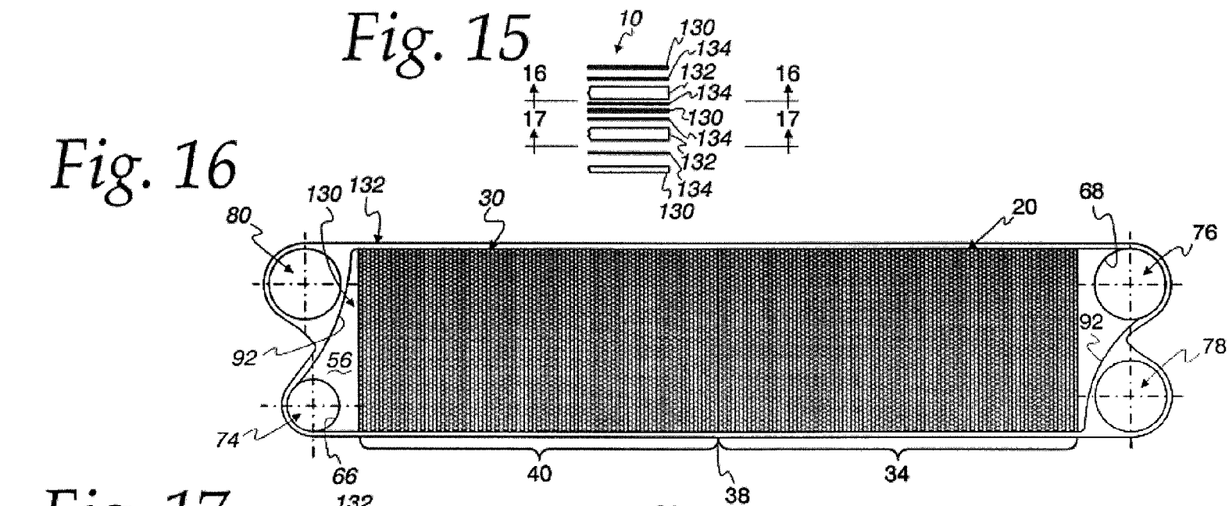
FIG. 15 is a partial, exploded, side elevation of another embodiment of the device shown in FIG. 1.
FIG. 16 is a view taken from line 16-16 in FIG. 15.
Figure 17:
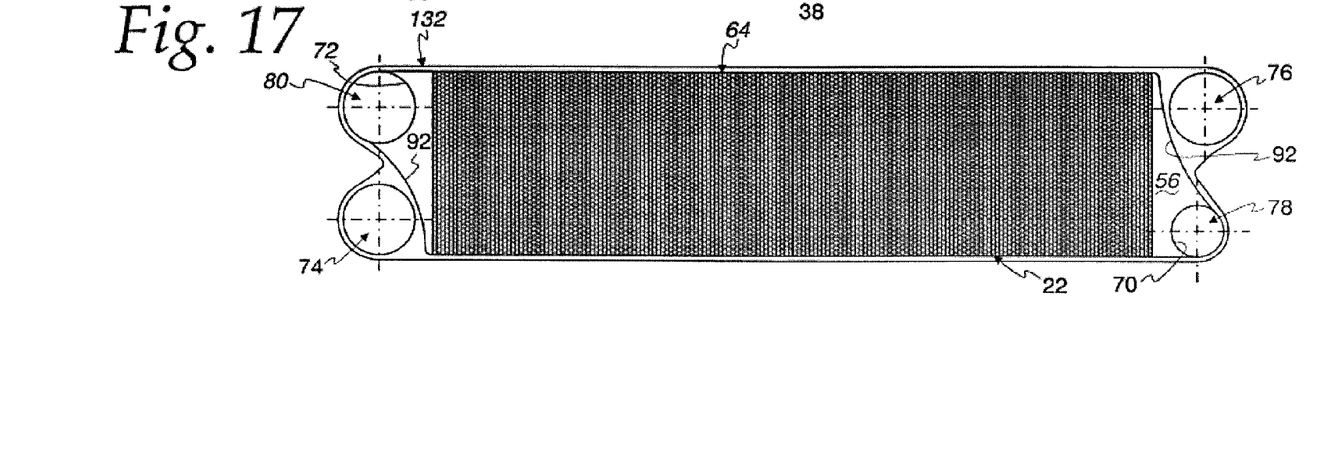
FIG. 17 is a view taken from line 17-17 in FIG. 15.

While the embodiments illustrated in FIGS. 1-14 are shown in connection with the drawn-cup type plates 52, all of the previously described embodiments for the turbulators 30 can also be used in a bar-plate type heat exchanger construction wherein the heat transfer surfaces 56 are provided by flat separator plates 130 and the embossed edge flanges 54 are provided by profiled bars 132, as best seen in FIGS. 15, 16 and 17 wherein like reference numbers indicate like features. Brazed sheets 134 are provided between the plates 130 and the bars 132. One additional difference between the previously described embodiments and that shown in FIGS. 15-17 is that the inserts 90 are no longer used because the profiled bars can provide the required profiled surface 92 as well as the ability to seal the associated openings 66, 68, 70 and 72.

Figure 18:
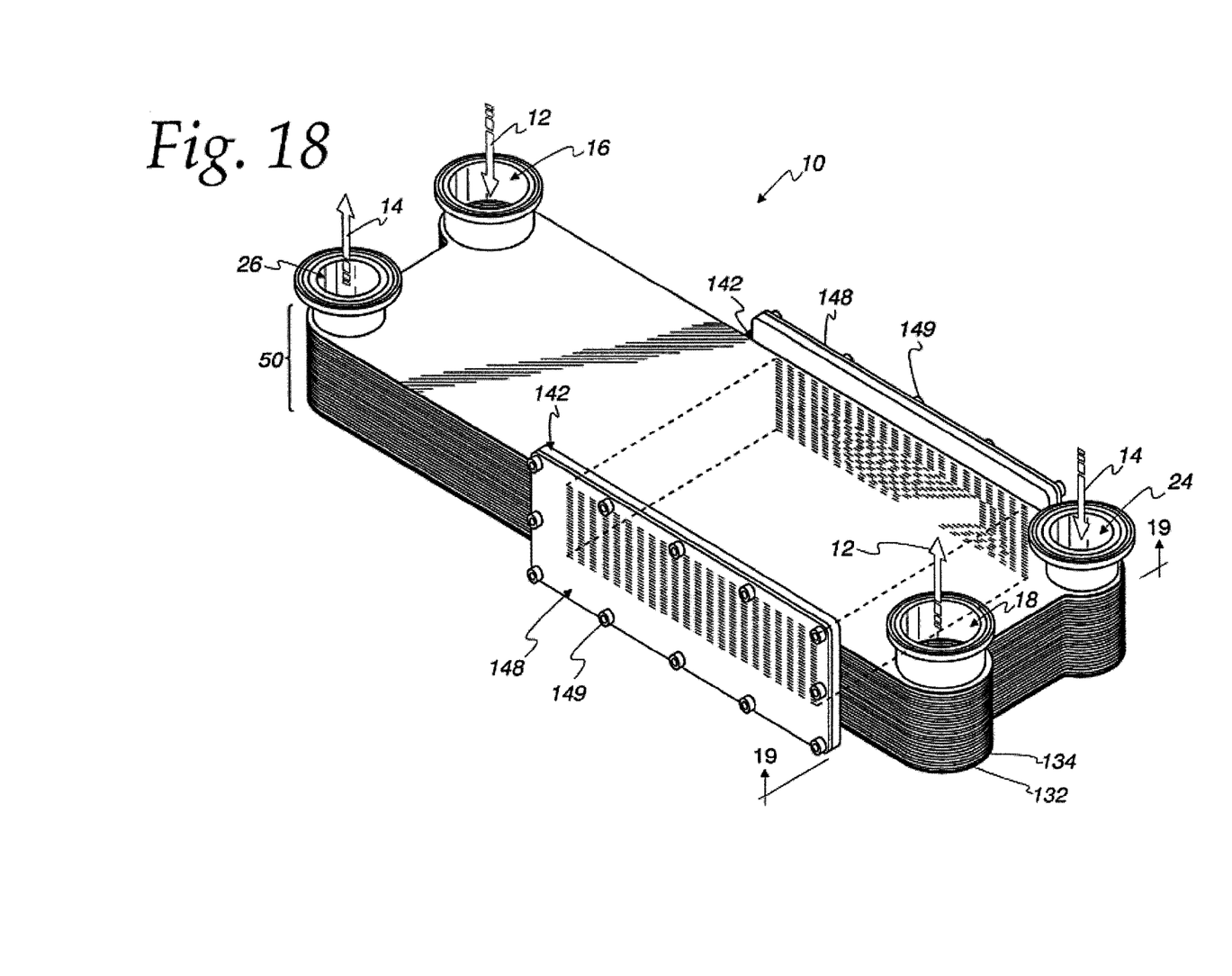
FIG. 18 is a perspective view of another version of a catalytic reactor/heat exchange device embodying the present invention.
Figure 19:
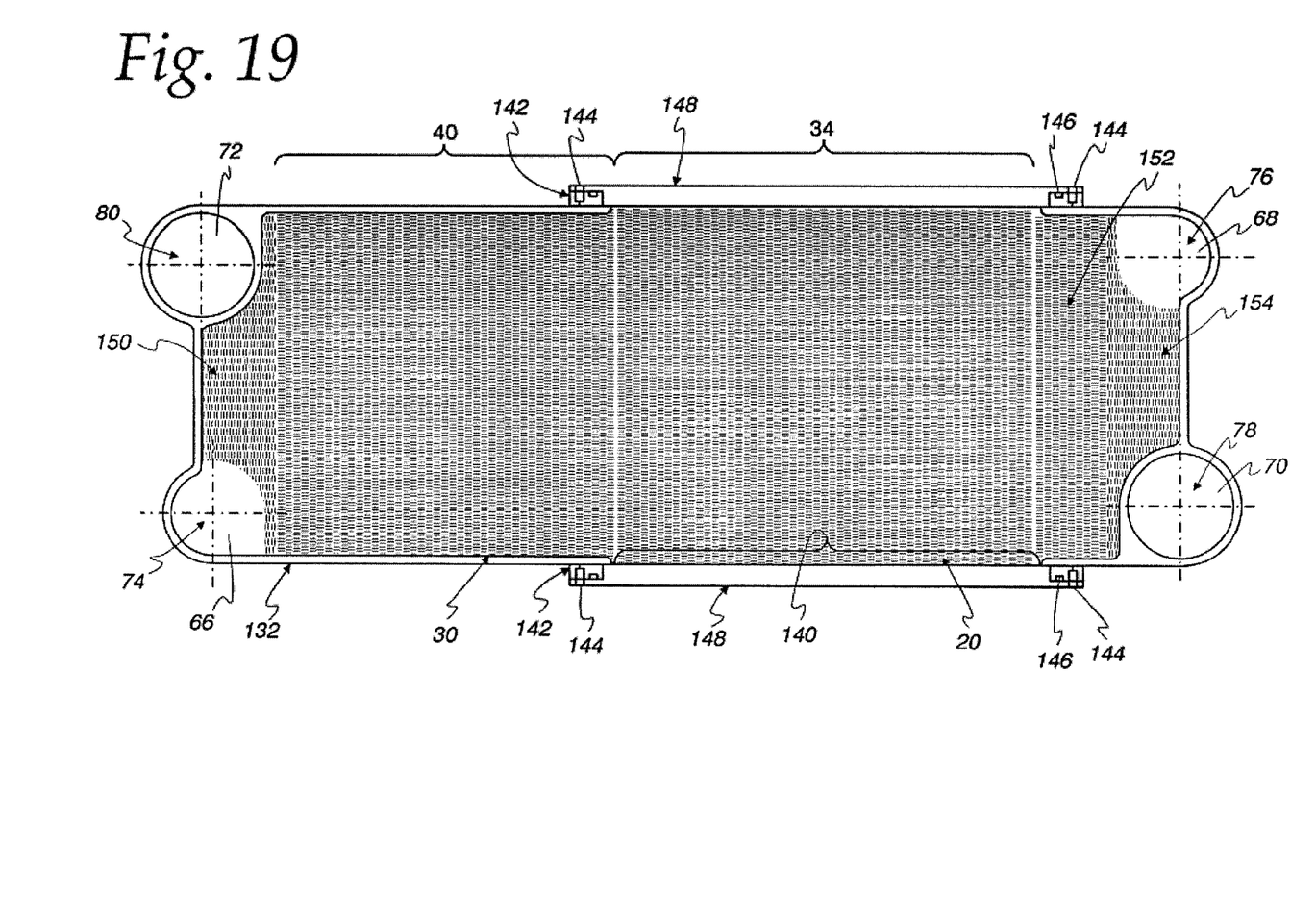
FIG. 19 is a view taken from line 19-19 in FIG. 18.

FIGS. 18 and 19 show another example of a bar-plate construction for the device 10, again with like numbers indicating like features. This embodiment differs from the previously described embodiments in that the bars 132 include interruptions 140 along their longitudinal sides at each of the flow channels 20 to allow insertion of the selected portion of the turbulator 30, which is provided as a multi-piece construction, rather than a unitary construction. In this regard, a pair of seal flanges 142 are brazed or welded to the bars 132 and include threaded holes 144 and a seal gland groove 146. Each of the flanges 142 receive and mount a cover plate 148 that is held in place by a plurality of bolts 149 that are received in the threaded holes 144. The cover plates can be removed to allow insertion of the selected portion 34 of the multi-piece turbulator 30. The multi-piece turbulator 30 allows for a number of options as follows. First, the catalytic layer 36 on the selected portion 34 can be applied to the selected portion 34 of the assembly after brazing the assembled device 10. Second, the initial portion 40 of the turbulator 30 can be an entirely different type of turbulator construction, or can have different dimensional parameters than that of the selected portion 34. Furthermore, inlet and outlet sections 150 and 152 can be provided adjacent the respective inlet openings 66 and their respective outlet openings 68 and again can be totally different types of turbulator fins than those of the other portions 34 and 40, can have different dimensional parameters than the other portions 34,40, or, as shown in FIG. 19 for lanced-and-offset turbulators, can have a completely different orientation that provides a higher inlet pressure drop so as to improve distribution across the flow channel 20. Finally, the multi-piece turbulator 30 can allow for a post-cooler section 154 that is downstream from the selected portion 34 so as to further cool the reaction fluid flow after it has undergone the catalytic reaction and before it exits the device 10, thereby potentially eliminating a need for a heat exchanger downstream from the device 10.

The invention claimed is:

1. A catalytic reactor/heat exchange device for generating a catalytic reaction in a reaction fluid flow and transferring heat to a cooling fluid flow, the catalytic reactor/heat exchange device comprising:
   a reaction flow inlet;
   a reaction flow outlet;
   a set of reaction flow channels extending between the reaction flow inlet to the reaction flow outlet to direct the reaction fluid flow through the device;
   a set of cooling flow channels interleaved with the reaction flow channels to direct the cooling fluid flow in heat exchange, counterflow relation with the reaction fluid flow; and
   turbulators in each of the reaction flow channels, a selected portion of each of the turbulators including a catalytic layer to initiate said catalytic reaction at a location spaced downstream from said reaction flow inlet, said catalytic layer beginning at said location and extending toward said reaction flow outlet, an initial portion of each of the turbulators extending between the reaction flow inlet to said location and being free of said catalytic layer to delay said catalytic reaction until the reaction fluid flow reaches said location.

2. The catalytic reactor/heat exchange device of claim 1 wherein said selected portion of each of said turbulators is a separate piece from said initial portion of each of said turbulators.

3. The catalytic reactor/heat exchange device of claim 1 wherein said selected portion and said initial portion of each of said turbulators are a unitary construction.

4. The catalytic reactor/heat exchange device of claim 1 wherein each of said reaction flow channels is bounded by a pair of spaced, generally planar heat transfer surfaces, and each of said turbulators includes a plurality of alternating peaks and valleys joined by wall sections, each of said peaks adjacent one of said pair of heat transfer surfaces, each of said valleys adjacent the other of said pair of heat transfer surfaces, each of said selected portions including a downstream section wherein said wall surfaces are interrupted by louvers having lengths that extend generally parallel to said pair of heat transfer surfaces.

5. The catalytic reactor/heat exchange device of claim 4 wherein said turbulators are lanced-and-offset fins.

6. The catalytic reactor/heat exchange device of claim 1 wherein each of said reaction flow channels is bounded by a pair of spaced, generally planar heat transfer surfaces, and each of said turbulators includes a plurality of alternating peaks and valleys joined by wall sections, each of said peaks adjacent one of said pair of heat transfer surfaces, each of said valleys adjacent the other of said pair of heat transfer surfaces, each of said selected portions including a downstream section wherein the peaks and valleys are spaced closer to each other than the peaks and valleys of the remainder of said selected portion in a direction transverse to the planes of said pair of heat transfer surfaces and are spaced from the pair of heat transfer surfaces to minimize the transfer of heat from said downstream section to the pair of heat transfer surfaces.

7. The catalytic reactor/heat exchange device of claim 6 wherein said turbulators are lanced-and-offset fins.

8. The catalytic reactor/heat exchange device of claim 1 wherein each of said reaction flow channels is bounded by a pair of spaced, generally planar heat transfer surfaces, and each of said turbulators includes a plurality of alternating peaks and valleys joined by wall sections, each of said peaks adjacent one of said pair of heat transfer surfaces, each of said valleys adjacent the other of said pair of heat transfer surfaces, each of said selected portions including
- an upstream section wherein the peaks and valleys are brazed to the pair of heat transfer surfaces, and
- a downstream section wherein the peaks and valleys are not brazed to the pair of heat transfer surfaces to minimize the transfer of heat from said downstream section to the pair of heat transfer surface.

9. The catalytic reactor/heat exchange device of claim 8 wherein said turbulators are lanced-and-offset fins.

10. The catalytic reactor/heat exchange device of claim 1 wherein each of said reaction flow channels is bounded by a pair of spaced, generally planar heat transfer surfaces, and each of said turbulators includes a plurality of alternating peaks and valleys joined by wall sections, each of said peaks adjacent one of said pair of heat transfer surfaces, each of said valleys adjacent the other of said pair of heat transfer surfaces, each of said selected portions including a downstream section wherein the peaks and valleys are removed to minimize the transfer of heat from said downstream section to the pair of heat transfer surfaces.

11. The catalytic reactor/heat exchange device of claim 1 wherein said reaction and flow channels are defined by plates located between each of said channels and bars located between each of the plates.

12. The catalytic reactor/heat exchange device of claim 11 wherein said turbulators are lanced-and-offset fins.

13. The catalytic reactor/heat exchange device of claim 1 wherein said flow channels are defined by drawn cup plates located between each of said channels with embossment that extend from each of the plates to contact adjacent plates to bound said flow channels.

14. The catalytic reactor/heat exchange device of claim 13 wherein:
- each of said flow plates includes a reaction flow inlet opening in fluid communication with said reaction flow inlet, a reaction flow outlet opening in fluid communication with a reaction flow outlet, a cooling flow inlet opening, and a cooling flow outlet opening;
- each of said reaction flow channels includes a pair of flow directing inserts therein, one of said inserts surrounding an aligned pair of said cooling flow outlet openings and including a profiled surface extending across said reaction flow channel from an aligned pair of said reaction flow inlet openings to direct the reaction fluid flow therefrom across said reaction flow channel, the other of said inserts surrounding an aligned pair of said cooling flow inlet openings and including a profiled surface extending across said reaction flow channel from an aligned pair of said reaction flow outlet openings to direct the reaction fluid flow across said reaction flow channel to said aligned pair of reaction flow outlet openings; and
- each of said cooling flow channels includes another pair of flow directing inserts therein, one of said inserts surrounding an aligned pair of said reaction flow outlet openings and including a profiled surface extending across said cooling flow channel from an aligned pair of said outlet flow inlet openings to direct the cooling fluid flow therefrom across said cooling flow channel, the other of said inserts surrounding an aligned pair of said reaction flow inlet openings and including a profiled surface extending across said cooling flow channel from an aligned pair of said cooling flow outlet openings to direct the cooling fluid flow across said reaction flow channel to said aligned pair of cooling flow outlet openings.

15. The catalytic reactor/heat exchange device of claim 1 wherein each of said initial portions occupies about 25% to 50% of the corresponding reaction flow channel.

16. The catalytic reactor/heat exchange device of claim 15 wherein each of said initial portions occupies about 25% of the corresponding reaction flow channel.

* * * * *

UNITED STATES PATENT AND TRADEMARK OFFICE
CERTIFICATE OF CORRECTION

PATENT NO. : 7,618,598 B2
APPLICATION NO. : 10/998852
DATED : November 17, 2009
INVENTOR(S) : Reinke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1360 days.

Signed and Sealed this

Twenty-sixth Day of October, 2010

David J. Kappos
*Director of the United States Patent and Trademark Office*